T. O'SULLIVAN.
SHIP BRAKE.
APPLICATION FILED JUNE 22, 1916.

1,223,416.

Patented Apr. 24, 1917.

Witnesses

Inventor
T. O'Sullivan
By
Att'ys

UNITED STATES PATENT OFFICE.

THOMAS O'SULLIVAN, OF MONTREAL, QUEBEC, CANADA.

SHIP-BRAKE.

1,223,416.     Specification of Letters Patent.     Patented Apr. 24, 1917.

Application filed June 22, 1916. Serial No. 105,219.

*To all whom it may concern:*

Be it known that I, THOMAS O'SULLIVAN, a subject of the King of Great Britain, and resident of the city of Montreal, in the Province of Quebec and Dominion of Canada, have invented certain new and useful Improvements in Ship-Brakes, of which the following is a full, clear, and exact description.

This invention relates to improvements in ship brakes, and the object of the invention is to provide a simple, inexpensive and effective device for rapidly checking the movement of vessels.

A further object is to provide a device which will not interfere with the movement of the vessel through the water at ordinary times.

The device consists essentially of a pair of plates hinged to the stem of a vessel and provided with means for opening and closing the same, so that they project a suitable distance laterally. Means is also provided for steadying the device in either open or closed position.

In the drawings which illustrate the invention:—

Figure 1:
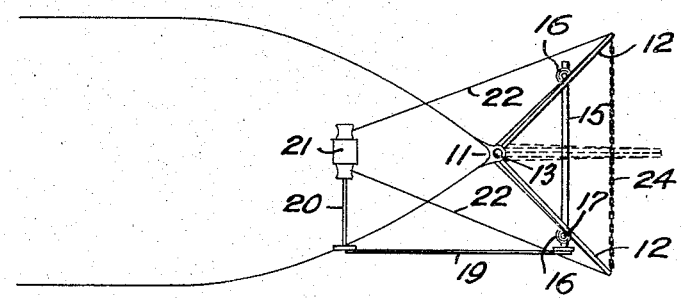
Figure 1 is a fragmentary plan view of a vessel showing the device in position thereon.
Figure 3:
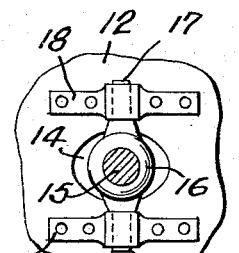
Fig. 3 is an enlarged detail elevation showing the method of connecting the plates and operating device.
Figure 2:
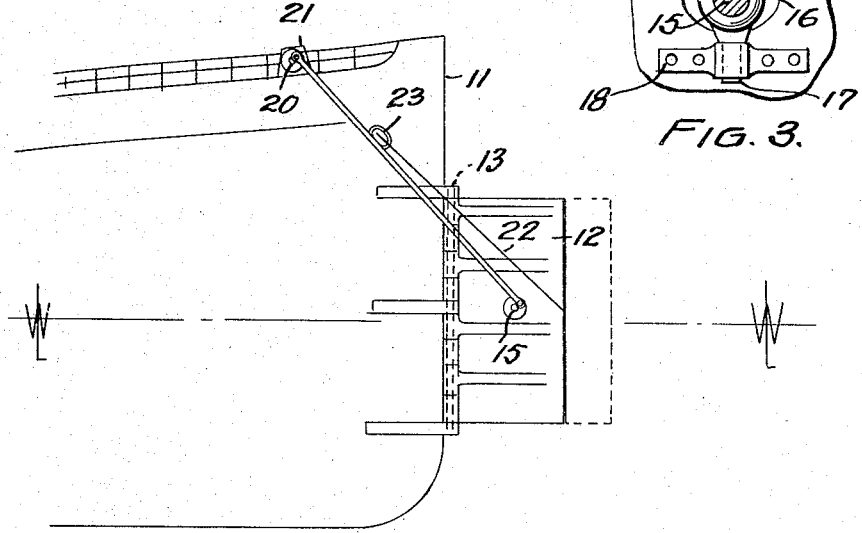
Fig. 2 is a fragmentary elevation corresponding to Fig. 1.

Referring more particularly to the drawings, 11 designates the stem of a vessel to which a pair of similar plates 12 are attached by any suitable hinge mechanism, including the hinge pin 13. These plates are of a size and dimension suited to the displacement of the vessel, and are arranged to project both above and below the water line. In each plate, an aperture 14 is provided, through which a large right and left hand screw 15 passes. Nuts 16 operate one on each half of the screw, and are provided with vertically disposed trunnions 17 pivotally connected to the plates 12 by means of suitable sockets 18, in order that the nuts may swing relatively to the plates as the same open and close, and so retain their proper operative relation with the screw.

The screw is operated by any suitable connection 19 driven from a shaft 20 carried by the capstan 21 or other suitable machinery. This mechanism 21 is arranged to wind and unwind the steadying cables 22 simultaneously with the operation of the screw. These cables, as will be seen, extend from the free edges of the plates to a suitable point or points on the vessel, and being kept always taut, hold the plates against swaying to one side or the other of the longitudinal axis of the vessel. These cables may extend into the vessel in any suitable manner, such as through the ordinary hawse pipes 23 or through any special means. The free edges of the plates 12 are connected to one another by a suitable number of chains 24, which limit the opening of the plates and relieve the screw and nuts or stress when the full opening is obtained.

The operation of the device will be apparent from the foregoing description.

Having thus described my invention, what I claim is:—

1. A ship brake, comprising a pair of plates hingeably secured to the stem of a ship, a right and left screw passing through the plates, and nuts operating on said screw pivotally mounted on the plates, and means for rotating the screw.

2. A ship brake, comprising a pair of plates hingeably secured to the stem of a ship, a right and left screw passing through the plates, nuts operating on said screw pivotally mounted on the plates, means for rotating the screw, means for steadying said plates in open and closed positions, and means for limiting the opening of the plates.

3. A ship brake, comprising a pair of plates hinged to the stem of a ship, a right and left screw arranged to open and close the plates, a power element on the ship, operative connection between said screw and the power element, steadying cables extending from the free edges of said plates to the power element, said power element being arranged to wind or unwind said steadying cables synchronously with the operation of the screw, whereby the cables will be kept taut at all times.

In witness whereof, I have hereunto set my hand, in the presence of two witnesses.

THOMAS O'SULLIVAN.

Witnesses:
C. W. TAYLOR,
G. M. MORELAND.